United States Patent
Hiralal

(10) Patent No.: US 11,605,856 B2
(45) Date of Patent: Mar. 14, 2023

(54) FLEXIBLE PACKAGING MATERIAL WITH INTEGRAL ELECTROCHEMICAL CELL

(71) Applicant: Zinergy UK Ltd., Cambridge (GB)

(72) Inventor: Pritesh Hiralal, Las Palmas (ES)

(73) Assignee: ZINERGY UK LTD., Cambridge (GB)

( * ) Notice: Subject to any disclaimer, the term of this patent is extended or adjusted under 35 U.S.C. 154(b) by 247 days.

(21) Appl. No.: 16/611,567

(22) PCT Filed: May 8, 2018

(86) PCT No.: PCT/GB2018/051231
§ 371 (c)(1),
(2) Date: Nov. 7, 2019

(87) PCT Pub. No.: WO2018/206935
PCT Pub. Date: Nov. 15, 2018

(65) Prior Publication Data
US 2020/0235348 A1   Jul. 23, 2020

(30) Foreign Application Priority Data
May 8, 2017  (GB) ...................................... 1707352

(51) Int. Cl.
*H01M 50/124* (2021.01)
*H01M 50/10* (2021.01)
*H01M 50/183* (2021.01)

(52) U.S. Cl.
CPC ......... *H01M 50/124* (2021.01); *H01M 50/10* (2021.01); *H01M 50/183* (2021.01)

(58) Field of Classification Search
CPC .. H01M 50/124; H01M 50/10; H01M 50/183; H01M 6/40; H01M 50/105;
(Continued)

(56) References Cited

U.S. PATENT DOCUMENTS

| 5,460,904 A | 10/1995 | Gozdz et al. |
| 2003/0059673 A1* | 3/2003 | Langan ............... H01M 50/129 429/185 |

(Continued)

FOREIGN PATENT DOCUMENTS

EP    3026737 A2    6/2016

OTHER PUBLICATIONS

PCT International Search Report and Written Opinion dated Oct. 30, 2018 for Intl. App. No. PCT/GB2018/051231, from which the instant application is based, 14 pgs.

(Continued)

*Primary Examiner* — Matthew T Martin
*Assistant Examiner* — Adam J Francis
(74) *Attorney, Agent, or Firm* — Fredrikson & Byron, P.A.

(57) ABSTRACT

A flexible multi-layer packaging material is provided. The packaging material includes a first film layer, a second film in layer, and at least one electrochemical cell located within the first and second film layers. The electrochemical cell comprises an anode, a cathode, an anode current collector, a cathode current collector, and an electrolyte by which the anode and the cathode are ionically connected. At least one of the first and second film layers is a multi-layer laminate comprising an outer insulating layer, an inner insulating layer, and a conductive moisture barrier layer between the inner and outer insulating layers and in electrical contact with the electrolyte, wherein the conductive moisture barrier layer comprises an anode material such that the conductive moisture barrier layer defines both the anode and the anode current collector of the at least one electrochemical cell or wherein the conductive moisture barrier layer comprises a cathode material such that the conductive moisture barrier layer defines both the cathode and the cathode current (Continued)

collector of the at least one electrochemical cell. A battery pouch cell and a pack of consumer goods comprising a container formed from such a packaging material are also provided.

15 Claims, 5 Drawing Sheets

(58) Field of Classification Search
CPC .. H01M 50/184; H01M 50/186; H01M 50/50; H01M 50/55; H01M 50/557
See application file for complete search history.

(56) References Cited

U.S. PATENT DOCUMENTS

| | | |
|---|---|---|
| 2006/0159990 A1 | 7/2006 | Ryu et al. |
| 2006/0216586 A1 | 9/2006 | Tucholski |
| 2013/0089769 A1* | 4/2013 | Proctor ................. H01G 11/42 429/127 |
| 2015/0325819 A1* | 11/2015 | Minamitani ........ H01M 50/126 156/60 |
| 2016/0204394 A1* | 7/2016 | Minamitani ........ H01M 50/555 429/163 |
| 2016/0248052 A1* | 8/2016 | Minamitani ...... H01M 10/0587 |
| 2017/0018810 A1* | 1/2017 | Ladroue ............. H01M 4/0407 |

OTHER PUBLICATIONS

Search Report dated Nov. 8, 2017 for related British Application No. GB1707352.9, 3 pgs.

* cited by examiner

FLEXIBLE PACKAGING MATERIAL WITH INTEGRAL ELECTROCHEMICAL CELL

RELATED APPLICATIONS

This application is a 35 U.S.C. 371 national stage filing from International Application No. PCT/GB2018/051231, filed May 8, 2018, which claims priority to British Application No. 1707352.9, filed May 8, 2017, the teachings of which are incorporated herein by reference.

This invention relates to flexible packaging materials. In particular, this invention relates to flexible packaging materials having at least one electrochemical cell. The invention also relates to packs of consumer goods comprising containers formed from such flexible packaging materials and to battery pouch cells formed from such flexible packaging materials.

Flexible packaging materials typically comprise one or more multi-layer films which are adhered or "laminated" together. This allows a packaging material to be produced with the desired properties of each of the material layers from which the packaging material is formed. The choice of layers may be varied in order to suit the required function and desired cost of the packaging material. Such packaging materials are used as packaging and protective materials in many industries, including the food and drink industries and the electronics industry. A common multi-layer film used as a packaging material in the food industry is a triple layer laminate consisting of a structural outer layer, such as a PET or nylon film, a chemically inert inner layer, such as a polyethylene (PE) or polypropylene (PP) film, and a barrier layer, such as an aluminium film, sandwiched between the inner and outer layers to provide a moisture and oxygen barrier. The outer layer provides strength to the multi-layer film, as well as a printable surface onto which graphics, logos, information, or other packaging indicia may be printed. The inner layer is typically thermoplastic so that the packaging material may be folded around a product and bonded to itself through the application of heat, without compromising its barrier properties.

Electrochemical batteries are commonly used in a wide variety of industrial and consumer electronics applications. A battery typically comprises a positive electrode, or "anode", and a negatively charged electrode, or "cathode". The anode and the cathode are ionically connected by an electrolyte. The anode and the cathode are formed from dissimilar materials, such that the anode and the cathode have different electrochemical potentials. Batteries may be primary or secondary batteries.

Recently, there have been efforts to reduce the thickness of batteries. Methods such as lamination, printing and lithography are being used to create thin batteries, typically with a thickness of around 600 micrometres. The low thickness can allow such thin batteries to be used for a wide range of applications for which conventional batteries are unsuitable, particularly where the thin batteries are also flexible. For example, thin batteries may be combined with a flexible packaging material to provide a flexible packaging material with an integral battery. This battery may then provide a supply of electrical energy to an electrical device, or devices associated with the packaging material. For example, such batteries may be used to power RFID tags, advertising or promotional devices, security tags, or condition indicators.

In some known flexible packaging materials with an integral battery, a pair of conventional multi-layer films are each used as a printing substrate onto which the active battery components are printed or deposited and between which the battery components are sandwiched. The multi-layer films provide the necessary strength and barrier properties to the packaging material, while the battery components allow the packaging material to provide an electrical current to an electrical device associated with the packaging material. The battery components generally include an electrolyte layer sandwiched between an anode layer and a cathode layer, an anode current collector on the opposite side of the anode layer to the electrolyte layer, and a cathode current collector on the opposite side of the cathode layer to the electrolyte layer. Thus, the resulting packaging material typically comprises five battery component layers in addition to the multiple layers of both of the multi-layer films on either side of the battery component layers. This arrangement allows packaging materials with a thickness of less than 0.5 mm to be produced, although 0.6 to 0.7 mm is more common. This may result in limited flexibility and could prevent use of the resulting packaging material for some applications in which thickness is critical. It also requires the electrical contact to be taken outside of the casing through the entire thickness of at least one of the multi-layer films in order for the electrical current to be provided to an electrical device associated with the packaging. This may result in a weak point in the sealing.

Accordingly, it would be desirable to provide an improved flexible packaging material with a thin film battery incorporated therein which is thinner than existing packaging materials.

According to a first aspect of the present invention, there is provided a flexible multi-layer packaging material comprising: a first film layer; a second film layer, and at least one electrochemical cell located within the first and second film layers, the at least one electrochemical cell comprising an anode, a cathode, an anode current collector, a cathode current collector, and an electrolyte by which the anode and the cathode are ionically connected, wherein at least one of the first and second film layers is a multi-layer laminate comprising an outer insulating layer, an inner insulating layer, and a conductive moisture barrier layer between the inner and outer insulating layers and in electrical contact with the electrolyte, wherein the conductive moisture barrier layer comprises an anode material such that the conductive moisture barrier layer defines both the anode and the anode current collector of the at least one electrochemical cell.

According to a second aspect of the present invention, there is provided a flexible multi-layer packaging material comprising: a first film layer; a second film layer, and at least one electrochemical cell located within the first and second film layers, the at least one electrochemical cell comprising an anode, a cathode, an anode current collector, a cathode current collector, and an electrolyte by which the anode and the cathode are ionically connected, wherein at least one of the first and second film layers is a multi-layer laminate comprising an outer insulating layer, an inner insulating layer, and a conductive moisture barrier layer between the inner and outer insulating layers and in electrical contact with the electrolyte, wherein the conductive moisture barrier layer comprises an cathode material such that the conductive moisture barrier layer defines both the cathode and the cathode current collector of the at least one electrochemical cell.

With this arrangement, the electrical conductivity of the moisture barrier layer is utilised to avoid the need for an additional current collector layer to be included in the flexible packaging material. The moisture barrier layer thus performs the dual roles of providing a moisture barrier and providing a means by which electrical current between the anode and cathode may be drawn away from the electrochemical cell. This allows the thickness of the overall structure to be reduced compared to existing materials in which current collector layers are provided separately to the outer layers. The flexibility of the packing material may also be increased, primarily due to this reduction in thickness. As an additional benefit, with this arrangement, it is possible to access the current collector defined by the moisture barrier layer simply by making a through-hole anywhere in the over-lying outer insulating layer. This means that the seal provided by the barrier layer may be maintained without the need for any special arrangements for accessing the current collector.

Furthermore, with this arrangement, the moisture barrier layer of at least one of the first and second film layers acts as moisture barrier and either as the anode and anode current collector or as the cathode or cathode current collector. By arranging the packaging material such that the moisture barrier layer performs all three functions, the overall thickness of the packaging material may be reduced further and its flexibility further increased.

In some embodiments, only one of the first and second film layers is a multi-layer laminate having a conductive moisture barrier layer which defines an electrode and a current collector of the at least one electrochemical cell. In such embodiments, the other film layer may be a single layer film or a multi-layer film with the same or different structure to the multi-layer laminate. In such embodiments, an additional current collector layer is provided for the other electrode. For example, the anode and the anode current collector may be defined by the moisture barrier layer of one of the first and second multi-layer laminates with the cathode being provided as a separate component and the cathode current collector being provided as an additional, discrete layer, or vice versa.

In preferred embodiments, each of the first and second film layers is a multi-layer laminate comprising an outer insulating layer, an inner insulating layer, and a conductive moisture barrier layer between the inner and outer insulating layers and in electrical contact with the electrolyte, wherein the conductive moisture barrier layer of the first film layer comprises an anode material such that the conductive moisture barrier layer of the first film layer defines both the anode and the anode current collector of the at least one electrochemical cell and wherein the conductive moisture barrier layer of the second film layer comprises a cathode material such that the conductive moisture barrier layer of the second film layer defines both the cathode and the cathode current collector of the at least one electrochemical cell. This allows a further reduction in the thickness and flexibility of the packaging material.

One or more intermediate layers may be provided between the first and second multi-layer laminates. Preferably, the first and second multi-layer laminates are fixed to each other directly such that the inner layer of the first multi-layer laminate abuts the inner layer of the second multi-layer laminate.

In any of the above embodiments, the moisture barrier layer or layers may be in electrical contact with the at least one electrolyte directly, or indirectly via one or more intermediate conductive layers or components. For example, one or more conductive components may extend through the inner layer of one or both of the first and second film layers to place the at least one electrolyte in electrical contact with the respective moisture barrier layer.

In preferred embodiments, the packaging material further comprises at least one cell cavity within which one or more components of the at least one electrochemical cell are located and, the at least one cell cavity being defined by at least one aperture in the inner layer of one or both of the first and second film layers. The moisture barrier layer of the first or second film layer may then be in electrical contact with the at least one electrolyte through the at least one aperture in its inner insulating layer. With this arrangement, the overall thickness of the packing material may be further reduced, since the thickness of the active cell components within the at least one aperture is accommodated by the thickness of the inner layer within which the at least one aperture is formed.

Where the packaging material further comprises at least one cell cavity, one or more of the electrolyte, the anode, and the cathode of the at least one electrochemical cell may be contained in the at least one cell cavity. In some preferred embodiments, the at least one cell cavity may contain only the electrolyte. In other preferred embodiments, the at least one cell cavity may contain the electrolyte and the cathode or the anode.

Where the packaging material further comprises at least one cell cavity, the first and second film layers are preferably sealed together around the at least one cell cavity. Thus a continuous seal may be formed around the at least one cell cavity.

The at least one cell cavity may be defined by at least one aperture in a single one of the first and second film layers, for example where only a single one of the first and second film layers is a multi-layer laminate. In such embodiments, the depth of the at least one cell cavity is determined by the thickness of the single inner layer in which the at least one aperture is provided.

In preferred embodiments, each of the first and second film layers is a multi-layer laminate comprising an outer insulating layer, an inner insulating layer, and a conductive moisture barrier layer between the inner and outer insulating layers, wherein the inner layer of each of the first and second film layers comprises at least one aperture through which the moisture barrier layer of each of the first and second film layers is in electrical contact with the electrolyte, such that the conductive moisture barrier layer of the first film layer defines the anode and anode current collector and the conductive moisture barrier layer of the second film layer defines the cathode and cathode current collector, and wherein the at least one aperture of the first film layer and the at least one aperture of the second film layer are substantially aligned to define the at least one cell cavity.

Where each of the first and second film layers is a multi-layer laminate, in some embodiments, the cathode is located in the at least one aperture of the second film layer, such that a first side of the cathode is in direct contact with electrolyte, while a second side of the cathode, which is opposite to the first side of the cathode, is in direct contact with the conductive barrier layer of the second film layer.

Preferably, the cathode is contained entirely within the at least one aperture.

Where each of the first and second film layers is a multi-layer laminate, the anode may be located in the at least one aperture of the first film layer, such that a first side of the anode is in direct contact with electrolyte, while a second side of the anode, which is opposite to the first side of the anode, is in direct contact with the conductive barrier layer of the first film layer.

Where each of the first and second film layers is a multi-layer laminate, the anode may be located in the at least one aperture of the first film layer and the cathode located in the at least one aperture of the second film layer, with the electrolyte being provided as an additional electrolyte layer between the anode and the cathode.

The anode of one of more electrochemical cells may be provided as a discrete layer or component between the electrolyte and the moisture barrier layer of the first film layer.

In preferred embodiments, the first film layer is a multi-layer laminate comprising an outer insulating layer, an inner insulating layer, and a conductive moisture barrier layer between the inner and outer insulating layers and in electrical contact with the electrolyte, wherein the conductive moisture barrier layer of the first film layer comprises an anode material such that the conductive moisture barrier layer of the first film layer defines both the anode and the anode current collector of the at least one electrochemical cell.

With this arrangement, the moisture barrier layer of the first film layer acts as moisture barrier, as the anode, and as the anode current collector. By arranging the packaging material such that the moisture barrier layer of the first film layer performs all three functions, the overall thickness of the packaging material may be reduced further and its flexibility further increased.

In some embodiments, the second film layer is a multi-layer laminate comprising an outer insulating layer, an inner insulating layer, and a conductive moisture barrier layer between the inner and outer insulating layers and in electrical contact with the electrolyte, wherein the conductive moisture barrier layer of the second film layer comprises a cathode material such that the conductive moisture barrier layer of the second film layer defines both the cathode and the cathode current collector of the at least one electrochemical cell.

With this arrangement, the moisture barrier layer of the second film layer acts as moisture barrier, as the cathode, and as the cathode current collector. By arranging the packaging material such that the moisture barrier layer of the second film layer performs all three functions, the overall thickness of the packaging material may be reduced further and its flexibility further increased.

In certain preferred embodiments, the first film layer is a multi-layer laminate in which the conductive moisture barrier layer comprises an anode material and the inner layer comprises at least one aperture within which the electrolyte is located, and the second film layer is a multi-layer laminate in which the inner layer comprises at least one aperture within which the cathode is located, wherein the moisture barrier layer of the first multi-layer laminate is in direct contact with the electrolyte such that the anode and the anode current collector are defined by the moisture barrier layer of the first multi-layer laminate, and wherein the cathode is in direct contact with the electrolyte on its first side and with the conductive barrier layer of the second multi-layer laminate on its second side such that the conductive barrier layer of the second multi-layer laminate defines the cathode current collector of the at least one electrochemical cell.

The flexible packaging material may comprise a single electrochemical cell. In preferred embodiments, the flexible packaging material comprises a plurality of electrochemical cells according to any of the embodiments described above.

Where the packaging material further comprises at least one cell cavity within which one or more components of the at least one electrochemical cell are located, preferably the at least one cell cavity is a plurality of cell cavities and the at least one electrochemical cell is a plurality of electrochemical cells, each of which is at least partially located within an individual cell cavity.

Preferably the inner layer of the first film layer comprises a plurality of apertures within which each electrolyte is located and through which each electrolyte is in electrical contact with the moisture barrier layer of the first film layer, the plurality of apertures of the first film layer defining at least part of each of the plurality of cell cavities.

Preferably the inner layer of the second film layer comprises a plurality of apertures within which each cathode is located and through which each cathode is in electrical contact with the moisture barrier layer of the second film layer, the plurality of apertures of the second film layer defining at least part of each of the plurality of cell cavities.

In certain preferred embodiments, the inner layer of the first film layer comprises a plurality of apertures within which each electrolyte is located and through which each electrolyte is in electrical contact with the moisture barrier layer of the first film layer, and the inner layer of the second film layer comprises a plurality of apertures within which each cathode is located and through which each cathode is in electrical contact with the moisture barrier layer of the second film layer, and wherein the conductive barrier layers of the first and second film layers define the anode current collector and the cathode current collector, respectively, of the plurality of electrochemical cells.

In any of the above embodiments, one or both of the first and second film layers comprises at least one contact aperture by which the anode current collector or the cathode current collector, or both, is exposed to outside of the flexible multi-layer packaging material.

By including one or more contact apertures, one or both of the current collectors may be exposed to the outside, allowing current to be drawn from the current collector using one or more electrical contacts without breaking the moisture barrier provided by the packaging material and without the need for any special arrangements for accessing the current collector.

In such embodiments, the at least one contact aperture is preferably provided through the outer insulating layer of one or both of the first and second film layers such that the adjacent conductive moisture barrier layer is exposed to outside of the flexible multi-layer packaging material.

In some embodiments, one of the first and second film layers comprises at least one first contact aperture in its outer insulating layer, by which its conductive barrier layer is exposed to outside of the flexible multi-layer packaging material, and at least one second contact aperture extending through its entire thickness by which the anode current collector or cathode current collector of the other one of the first and second film layers is exposed to outside of the flexible multi-layer packaging material on the same side of the flexible multi-layer packaging material as the at least one first aperture.

With this arrangement, current may be drawn from both current collectors from the same side of the packaging material. This provides a particularly convenient arrangement. Preferably, in such embodiments, the other of the first and second film layers is also a multi-layer laminate having a conductive moisture barrier layer. In this manner, the packaging material maintains moisture barrier properties despite the second contact aperture extending through the entire thickness of one of the film layers.

The at least one second contact aperture is formed from an aperture through each of the outer insulating layer, conductive moisture barrier layer, and inner insulating layer of the first or second film layer. The apertures through the outer insulating layer, conductive moisture barrier layer, and inner insulating layer by which the at least one second contact aperture is defined may have substantially the same size, such that the at least one second contact aperture is straight-sided.

In preferred embodiments, the at least one second contact aperture is defined by an aperture through each of the outer insulating layer, conductive moisture barrier layer, and inner insulating layer of the respective first or second film layer, wherein the aperture through the conductive moisture barrier layer has a larger diameter than the aperture through one or both of the inner insulating layer and the outer insulating layer. With this arrangement, the risk of shorting of the conductive barrier layer may be reduced, since the conductive barrier layer may be shielded by the insulating layers from any electrical contacts extending through the at least one second aperture.

In certain preferred embodiments, each of the first and second film layers is a multi-layer laminate and the at least one second contact aperture through one of the first or second film layers is aligned with at least one third contact aperture in the inner insulating layer of the other of the first and second film layers to expose the conductive moisture barrier layer of the other of the first and second film layers to outside of the flexible multi-layer packaging material.

In such embodiments, the diameter of the at least one second contact aperture may be substantially the same as the diameter of the at least one third contact aperture. Preferably, the diameter of the at least one second contact aperture is larger than the diameter of the at least one third contact aperture. With this arrangement, the at least one second contact aperture may rest against the inner insulating layer in which the at least one third contact aperture is defined. This may reduce the risk of electrical contact between the conductive barrier layers.

The moisture barrier layers may be provided as discrete layers, each of which is laminated between the inner and outer layers of its respective multi-layer laminate.

Alternatively, the moisture barrier layer of one or both of the first and second film layers may be provided as a coating applied on the inner surface of its respective outer insulating layer. In such embodiments, the coating may be applied by any suitable conventional process. For example, the moisture barrier layer may be applied to the outer insulating layer by physical vapour deposition. In certain examples, one or both of the outer insulating layers is a metallised film whereby the metal coating forms the conductive moisture barrier layer associated with that outer insulating layer.

With this arrangement, the resulting moisture barrier layer may be very thin (a few hundred nm) and so the overall thickness and flexibility of the flexible packaging material may be further reduced. Although the electrical conductivity of a barrier layer applied as a coating may be less than that of a discrete film, the resulting conductivity properties have been found to be sufficient for the barrier layer to function as a current collector. The costs and weight of the moisture barrier layer may also be reduced relative to a discrete barrier layer.

In certain preferred embodiments, each of the first and second film layers is a multi-layer laminate comprising an outer insulating layer, an inner insulating layer, and a conductive moisture barrier layer between the inner and outer insulating layers and in electrical contact with the electrolyte, wherein the conductive moisture barrier layer of the first film layer comprises an anode material such that the conductive moisture barrier layer of the first film layer defines both the anode and the anode current collector of the at least one electrochemical cell and the conductive moisture barrier layer of the second film layer defines the cathode current collector of the at least one electrochemical cell, wherein the conductive the moisture barrier layer of the first film layer is provided as a discrete layer laminated between the inner and outer insulating layers of the first film layer and the conductive moisture barrier layer of the second film layer is provided as a coating applied on the inner surface of the outer insulating layer of the second film layer.

This has been found to provide a flexible packaging material with a particularly advantageous combination of moisture barrier properties and reduced thickness. It is particularly advantageous where the anode material is provided as part of the moisture barrier layer of the first film layer, since the overall thickness of the packaging material may be reduced by reducing the thickness of the conductive barrier layer of the second film layer without negatively affecting the amount of anode material in the electrochemical cell.

The conductive moisture barrier layers may comprise any suitable material. For example, the barrier layers may comprise a carbon layer, or a polymer, such as ethylene-vinyl acetate. Preferably, one or both of the conductive moisture barrier layers comprises a metal or alloy. The barrier layers may be formed from any suitable metal or alloy. Suitable metals include, but are not limited to, zinc, copper, nickel, tin, aluminium or copper. Where the barrier layers are provided as discrete layers, rather than as a conductive coating, one or both of the barrier layers may be formed from a flexible metal film, for example a zinc, copper, nickel, tin or aluminium film.

Where the conductive moisture barrier layers comprise a metal or alloy, the electrical conductivity and the barrier properties of the barrier layers may be increased. This may result in reduced internal resistance in the at least one electrochemical cell, particularly in comparison with cells in which one or both current collectors are formed using a printed layer of carbon.

The inner insulating layer of at least one of the first and second film layers may be a multi-layer laminate. Preferably, the multi-layer laminate of the inner insulating layer comprises first and second layers, wherein the first or inner layer has a melting point such that it is heat-sealable at a predetermined temperature and wherein the second or outer layer has a melting point which is above the predetermined temperature such that the second layer does not melt when the first layer is heat sealed.

This arrangement reduces the likelihood of electrical shorting between the two conductive moisture barrier layers during manufacture because the integrity of second layer is maintained during heat sealing, i.e. it is not damaged during the application of pressure and heat at the predetermined temperature.

The at least one electrochemical cell may further comprise a separator for separating the anode and cathode, wherein the inner insulating layer of at least one of the first and second film layers defines the separator, and wherein the inner insulating layer is porous at least in the region of the electrochemical cell such that the electrolyte can permeate the inner insulating layer in the region of the electrochemical cell to ionically connect the anode and cathode.

By arranging the packaging material such that the inner insulating layer of at least one of the first and second film layers defines the separator of the electrochemical cell, the overall thickness of the packaging material may be reduced further and its flexibility further increased.

The inner insulating layer and the conductive moisture barrier layer of at least one of the first and second film layers may be bonded together with a layer of adhesive, in which the adhesive layer comprises an opening in the region of the electrochemical cell to permit electrical contact between the conductive moisture barrier layer and the electrolyte and the adhesive layer may define a seal around the opening to resist leakage of the electrolyte from the electrochemical cell. This arrangement reduces the likelihood of the electrolyte leaking.

As used herein, the term "moisture barrier layer" refers to a layer which prevents or substantially prevents the permeation or penetration of water or water vapour. In particular, it refers to a layer or film having a moisture vapour transmission rate of less than 5 g/m2/day, preferably less than 1 g/m2/day, most preferably less than 0.1 g/m2/day.

Preferably one or both of the moisture barrier layers is also an oxygen barrier layer.

As used herein, the term "oxygen barrier layer" refers to a layer which prevents or substantially prevents the permeation or penetration of oxygen gas. In particular, it refers to a layer or film having an oxygen transmission rate of less than 50 mL/m2/day, preferably less than 5 mL/m2/day, most preferably less than 2 mL/m2/day.

As used herein, the term "conductive" denotes a layer having a sheet resistance of less than 30 ohms per square, preferably less than 10 ohms per square, most preferably less than 1 ohms per square.

The outer and inner insulating layers are each formed from an electrically insulating film and may be formed from any suitable material or materials. For example, the insulating layers may be formed from a polymer, such as polypropylene (PP), oriented PP, polymide, mylar, PET or Nylon, for example oriented Nylon. Such materials have been found to provide both sufficient strength and flexibility to the packaging material. Preferably, the outer insulating layer is formed from a PET or Nylon film, for example an oriented Nylon film. Preferably, the inner insulating layers are formed from a chemically inert material. Preferably the inner insulating layers are formed from a thermoplastic. This allows the first and second multi-layer laminates to bonded together through the application of heat and without the need for adhesives. This can simplify manufacture and reduce the thickness and rigidity of the resulting packaging laminate due to the fact that an additional adhesive layer is not required. Preferably the inner insulating layers are formed from a polypropylene, for example oriented polypropylene.

The electrolyte may be any suitable electrolyte. The electrolyte may comprise a salt. For example the electrolyte may comprise at least one of potassium salts, sodium salts, or lithium salts. The electrolyte may comprise a solvent. For example the electrolyte may comprise water. The electrolyte may comprise an aqueous solution of potassium hydroxide. Alternatively, or in addition, the electrolyte may comprise NaOH, or other alkalis, H2SO4, HCl, or other acids, for example. The electrode may comprise Tetraethylammonium tetrafluoroborate (TEABF4) in propylene carbonate or in acetonitrile. The electrolyte may be an ionic liquid. The electrolyte may be a solid, for example comprising one or more salts on a polymer base. The electrolyte may be a gel.

According to a third aspect of the present invention, there is provided a flexible multi-layer packaging material comprising: a first film layer; a second film layer, and at least one electrochemical cell located within the first and second film layers, the at least one electrochemical cell comprising an anode, a cathode, an anode current collector, a cathode current collector, a separator for separating the anode and cathode, and an electrolyte by which the anode and the cathode are ionically connected, wherein at least one of the first and second film layers is a multi-layer laminate comprising an outer insulating layer, an inner insulating layer, and a conductive moisture barrier layer between the inner and outer insulating layers and in electrical contact with the electrolyte, wherein the inner insulating layer of at least one of the first and second film layers defines the separator, wherein the inner insulating layer is porous at least in the region of the at least one electrochemical cell such that the electrolyte can permeate the inner insulating layer in the region of the electrochemical cell to ionically connect the anode and cathode.

By arranging the packaging material such that the inner insulating layer of at least one of the first and second film layers defines the separator of the electrochemical cell, the overall thickness of the packaging material may be reduced further and its flexibility further increased.

The inner insulating layer of at least one of the first and second film layers may be a multi-layer laminate. Preferably, the multi-layer laminate of the inner insulating layer comprises first and second layers, wherein the first layer has a melting point such that it is heat-sealable at a predetermined temperature and wherein the second layer has a melting point which is above the predetermined temperature such that the second layer does not melt when the first layer is heat sealed.

This arrangement reduces the likelihood of electrical shorting between the two conductive moisture barrier layers during manufacture because the integrity of second layer is maintained during heat sealing, i.e. it is not damaged during the application of pressure and heat at the predetermined temperature.

The inner insulating layer and the conductive moisture barrier layer of at least one of the first and second film layers may be bonded together with a layer of adhesive, in which the adhesive layer comprises an opening in the region of the electrochemical cell to permit electrical contact between the conductive moisture barrier layer and the electrolyte and the adhesive layer may define a seal around the opening to resist leakage of the electrolyte from the electrochemical cell. This arrangement reduces the likelihood of the electrolyte leaking.

According to a fourth aspect of the present invention, there is provided a method of manufacturing a flexible multi-layer packaging material comprising: providing a first film layer; providing a second film layer, and providing at least one electrochemical cell within the first and second film layers, the at least one electrochemical cell comprising an anode, a cathode, an anode current collector, a cathode current collector, a separator for separating the anode and cathode, and an electrolyte by which the anode and the cathode are ionically connected, wherein the step of providing at least one of the first and second film layers comprises providing a multi-layer laminate comprising an outer insulating layer, an inner insulating layer, and a conductive moisture barrier layer between the inner and outer insulating layers and in electrical contact with the electrolyte, the method further comprising treating the inner insulating layer of at least one of the first and second film layers prior to providing the multi-layer laminate to make the inner insulating layer porous at least in the region of the at least one electrochemical cell, and arranging the porous inner insulating layer such that it defines the separator.

The method may further comprise providing a layer of adhesive between the inner insulating layer and the conductive moisture barrier layer of at least one of the first and second film layers, wherein the adhesive layer is patterned, the pattern defining an opening in the adhesive layer in the region of the electrochemical cell to permit electrical contact between the conductive moisture barrier layer and the electrolyte. Preferably, the patterned adhesive layer may be provided by a gravure printing process. In the lamination industry gravure is conventionally only used to apply a continuous adhesive layer. However, it has been found that gravure can be used to apply a patterned adhesive layer to the laminate structure, which is both accurate and suitable for a mass manufacture or high-speed manufacturing environment.

According to a fifth aspect of the present invention, there is provided a battery pouch cell formed from a flexible multi-layer packaging material according to any of the embodiments described above.

According to a sixth aspect of the present invention, there is provided a pack of consumer goods comprising a container formed from a flexible packaging material according to any of the embodiments described above and an electrical device electrically connected to the at least one electrochemical cell of the flexible multi-layer packaging material. With this arrangement, the at least one electrochemical cell of the packaging material may be used to provide a supply of electrical power to the electrical device.

According to a seventh aspect of the present invention, there is provided a flexible multi-layer packaging material comprising: a first film layer; a second film layer, and at least one electrochemical cell located within the first and second film layers, the at least one electrochemical cell comprising an anode, a cathode, an anode current collector, a cathode current collector, and an electrolyte by which the anode and the cathode are ionically connected, wherein at least one of the first and second film layers is a multi-layer laminate comprising an outer insulating layer, an inner insulating layer, and a conductive moisture barrier layer between the inner and outer insulating layers and in electrical contact with the electrolyte, such that the conductive moisture barrier layer defines the anode current collector or the cathode current collector of the at least one electrochemical cell.

As used herein, the term "multi-layer packaging material" refers to a web of material in which the laminate structure is formed at least in part by the first and second film layers, for example by laminating the first and second film layers together.

As used herein, the term "container" refers to a package formed using the packaging material, for example by forming the packaging material around one or more consumer goods and forming a seal at the joined edges of the packaging material.

Any feature in one aspect of the invention may be applied to other aspects of the invention, in any appropriate combination. Furthermore, any, some and/or all features in one aspect can be applied to any, some and/or all features in any other aspect, in any appropriate combination.

It should also be appreciated that particular combinations of the various features described and defined in any aspects of the invention can be implemented and/or supplied and/or used independently.

The invention will be further described, by way of example only, with reference to the accompanying drawings in which:

FIG. 1 is a schematic perspective view of a flexible packaging material according to the invention;

FIG. 2 is cross-section of the flexible packaging material of FIG. 1 taken along line A-A, showing a first embodiment of laminate structure in which the first and second multi-layer laminates are shown separately for clarity; and FIG. 3 is cross-section of the flexible packaging material of FIG. 1 taken along line A-A, showing a second embodiment of laminate structure in which the first and second multi-layer laminates are shown separately for clarity.

Figure 1:
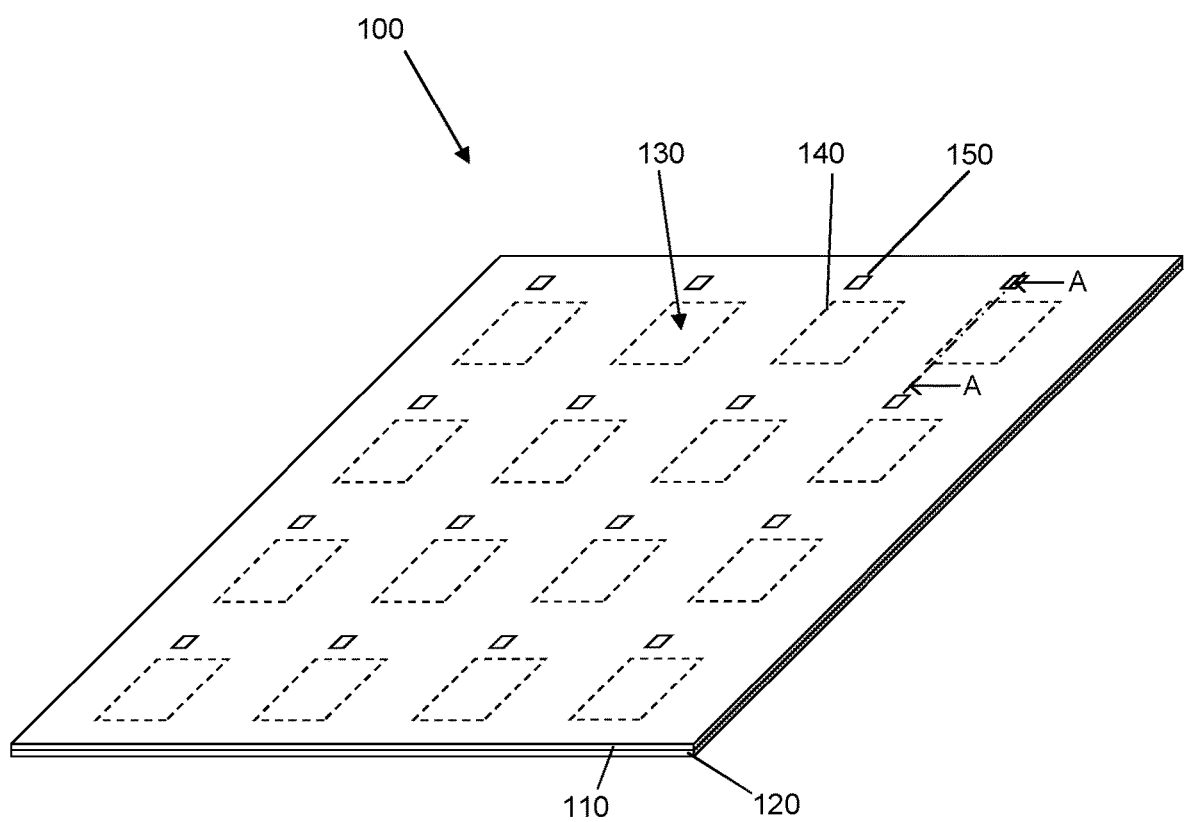

FIG. 1 is a schematic illustration of a flexible multi-layer packaging material 100 according to the present invention. The packaging material 100 comprises a first film layer 110 and a second film layer 120 which are bonded together. Each of the first and second film layers 110, 120 is a multi-layer laminate. The first film layer 110 forms an anode of the battery and the second multi-layer laminate 120 forms a cathode of the battery. The packaging material 100 further includes a plurality of electrochemical cells 130 within cell cavities 140 defined by the first and second film layers 110 and 120, as discussed below in relation to FIGS. 2 and 3. The first film layer 110 comprises a plurality of contact apertures 150 by which current from the electrochemical cells 130 may be drawn using electrical contacts (not shown). In this manner, the packaging material 100 may function both as a protective layer around a product and as a source of electrical power.

Figure 2:
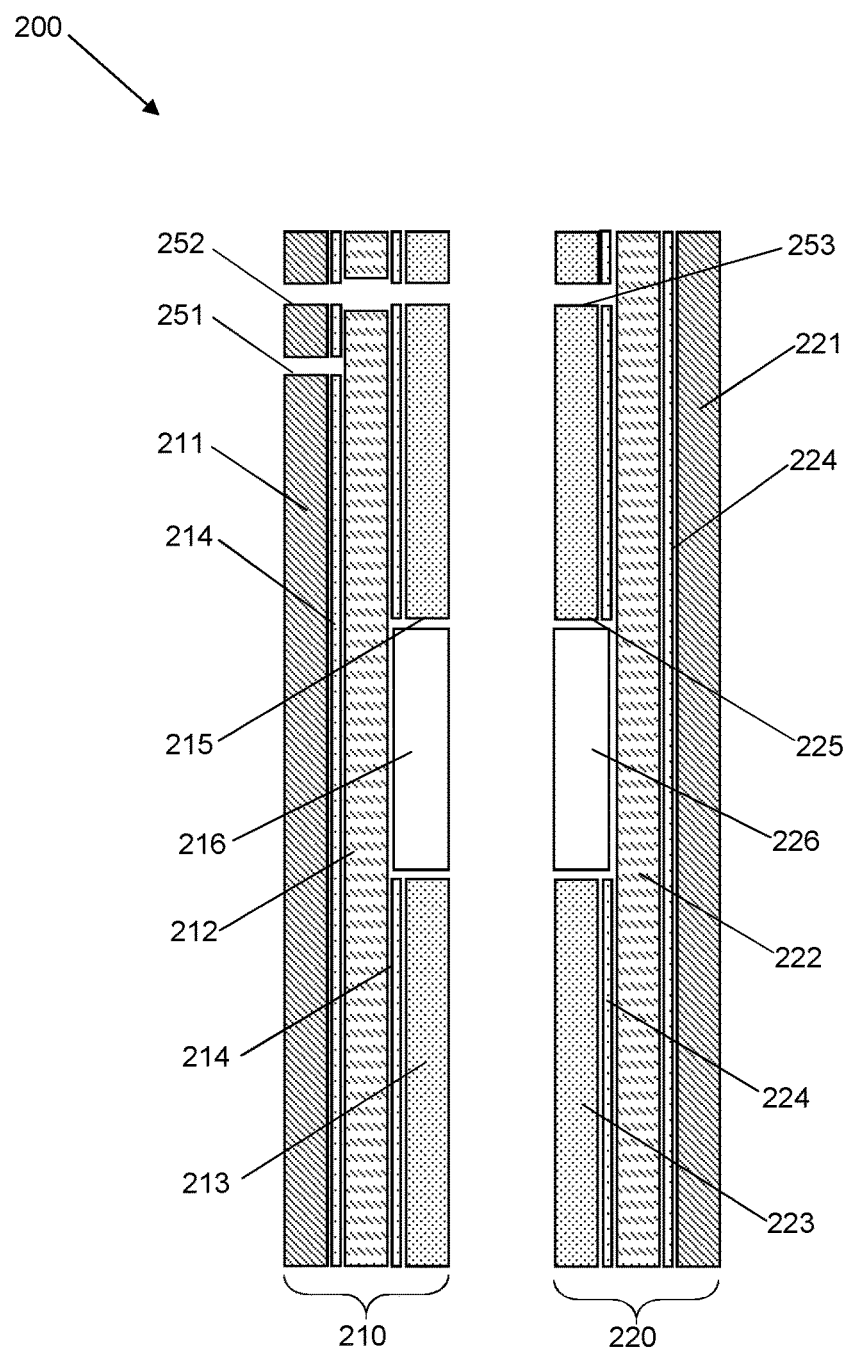

FIG. 2 is cross-section of the flexible packaging material of FIG. 1 taken along line A-A, showing a first embodiment of laminate structure 200 for the first and second film layers. The first and second film layers 210, 220 each have a laminate structure that is similar to that used in conventional triple-layer laminate packaging materials, for example those used in food packaging. As shown in FIG. 2, the first film layer 210 comprises a structural outer insulating layer 211, an inner insulating layer 213, and a metallic moisture barrier layer 212 sandwiched between the outer and inner layers 211, 213. The conductive moisture barrier layer 212 is bonded to each of the outer and inner layers 211, 213 using a thin layer of adhesive 214 having a thickness of from about 2 microns to about 25 microns. Similarly, the second film layer 220 comprises a structural outer layer 221, and inner layer 223 and a metallic barrier layer 222 sandwiched between the outer and inner layers 221, 223 and bonded together using a layer of adhesive 224. The first and second film layers 210, 220 are bonded to one another so that the inner layers 213 and 223 face each other and the outer layers 211, 221 form the outer surfaces of the packaging material.

The outer layers 211, 221 are each formed from an electrically insulative film. One or both of the outer layers 211, 221 are preferably printable, or "print receptive" so that they may form a printing substrate onto which information, branding, graphics, or other packaging indicia may be printed. In this example, the structural outer layers 211, 221 are formed from a thermoplastic such that they may be bonded together through the application of heat to form a seal. This allows the packaging material to folded around a product to be packaged and sealed together through the application of heat, either by bonding the first outer layer 211 to the second outer layer 221 or by bonding the first outer layer 211 or second outer layer 221 to itself. Suitable materials for the structural outer layers 211, 221 include polymers, such as PET or Nylon, for example oriented Nylon. Such materials have been found to provide both sufficient strength and flexibility to the packaging material.

The metallic barrier layers 212, 222 are each formed from a flexible metal film. The layers provide an oxygen and moisture barrier which is also electrically conductive. The presence of the barrier layers 212, 222 allows the packaging material to be used to protect the contents of a package from the surrounding environment. The barrier layers 212, 222 may be formed from any suitable metal or alloy. For example, the barrier layers 212, 222 may be formed from a zinc, copper, nickel, tin or aluminium film.

The inner layers 213, 223 are each formed from an electrically insulative film. These layers are chemically inert and are preferably formed from a thermoplastic such that they may be bonded together through the application of heat to form a seal. By this seal, the electrochemical cells may be contained within the packaging to prevent leakage of the electrolyte. Suitable materials for the inner layers 213, 223 include polymers, such as polypropylene, for example oriented polypropylene, polyethylene, or polyurethane.

Unlike conventional packaging materials, packaging materials according to the present invention have a plurality of electrochemical cells which can be connected to provide an electrical current to an electrical device associated with the packaging material. The cells make use of the conductivity of the metal barrier layers which exist in conventional packaging materials. To achieve this, the inner layers 213, 223 of each of the first and second film layers 210, 220 are each provided with a plurality of apertures 215, 225 extending through their respective thicknesses. The apertures 215 in the first film layer 210 are positioned adjacent to the apertures 225 in the second film layers 220 to form a plurality of enclosed cell cavities in the laminate structure 200. Each cell cavity is bounded on one side by the metal barrier layer 212 of the first film layer 210 and at the other by the metal barrier layer 222 of the second film layers. The inner layers 213, 223 of the first and second multi-layer laminates are bonded together around the apertures 215, 225 by the application of heat such that a continuous seal extends around each cell cavity. The apertures 215, 225 may be formed in a number of ways. For example, the apertures may be formed by stamping, die cutting, laser cutting or ablation, chemical erosion, or similar.

Within each aperture 215 of the first film layer 210 is an electrolyte 216 in contact with the first metal barrier layer 212. Within each aperture 225 of the second multi-layer laminate 220 is a cathode layer 226 in contact with both the electrolyte 216 and the second metal barrier layer. In this manner, the first and second barrier layers 212, 222 are ionically connected to each other across the cell cavity via the electrolyte 216 and the cathode layer 226. In this example, the electrolyte 216 comprises an aqueous solution of potassium hydroxide. In other examples, a polymer electrolyte may be used. The first and second inner layers 213, 223 are sealed together around each cell cavity by heat sealing. Thus a continuous seal is formed around each cell cavity. This may help to prevent the electrolyte 216 from leaking or drying out.

In this example, the conductive barrier layer 212 of the first film layer 210 comprises an anode material such that the conductive barrier layer 212 forms both the anode current collector and the anode. This allows the aperture 215 to be filled with the electrolyte. In other examples in which the conductive barrier layer 212 does not comprise the anode material, the aperture 215 will also contain an anode layer between the conductive barrier layer and the electrolyte.

The cathode layer 226 is formed from a different material to the first metal barrier layer 212 such that the cathode layer 226 and the first metal barrier layer have different electrochemical potentials. For example, where the first metal barrier layer 212 is zinc, the cathode layer 226 may, for example, be formed from manganese oxide, silver oxide, or nickel. It will be apparent that a variety of different materials may be used for the first barrier layer 212 and the cathode layer 226 to form a variety of anode/cathode pairs. The first barrier layer 212 and the cathode material 226 are ionically connected across the electrolyte 216 and interact to create a voltage difference across the electrolyte 216. Thus, the first barrier layer 212 and the cathode layer 226 form an anode and cathode, respectively, of an electrochemical cell in the region of the cell cavity. Further, due to the conductive nature of the first barrier layer 212 it also acts as a current collector on the anode side, as well as a moisture and oxygen barrier. Similarly, the second barrier layer 212 acts as a current collector on the cathode side, as well as a moisture and oxygen barrier.

The packaging material 200 further includes a first contact aperture 251 extending through the outer insulating layer 211 of the first film layer 210, and includes a second contact aperture 252 extending through the entire thickness of the first film layer 210 and aligned with a third contact aperture 253 through the inner insulating layer 223 of the second film layer 220. The first contact aperture 251 exposes the conductive barrier layer 212 of the first film layer 210 to outside of the packaging material 200, while the second contact aperture 252 and third contact aperture expose the conductive barrier layer 222 of the second film layer 220 to outside of the packaging material 200. As shown, the aperture in the conductive barrier layer 212 forming part of the second contact aperture 252 has a larger diameter than the adjacent apertures through the inner and outer insulating layers 211, 213. With this arrangement, the conductive barrier layer 212 is set back within the second contact aperture to reduce the risk of electrical shorting between the conductive barrier layers 212, 222. The plurality of first and second contact apertures may then be connected to using electrical contacts to connect the plurality of electrochemical cells and allow current to be drawn therefrom.

Packaging materials according to the invention include a plurality of electrochemical cells, as described above, which may be connected together in series or parallel, or a combination of series and parallel, via the contact trenches associated with each cell to provide an electrical current to an electrical load associated with the packaging material.

By making use of the conductive nature of the barrier layers used in conventional packaging and incorporating these into an electrochemical cell structure, packaging materials according to the invention are able to provide an extremely thin, flexible battery for providing electrical power to an electrical device, or devices, associated with the packaging.

The inner insulating layers and the outer structural layers of the first and second film layers may have any suitable thicknesses, for example from 9 to 100 microns. The conductive barrier layers may also have any suitable thickness, for example from 9 to 50 microns.

In this example, the first film layer 210 comprises an outer structural layer 211 formed from a PET film having a thickness of 12 microns, a conductive barrier layer 212 formed from zinc film having a thickness of 20 microns, and an inner layer 213 formed from an oriented PP film having a thickness of 30 microns and which is heat sealable at about 130 degrees Celsius. The three layers are bonded together using intermediate layers of adhesive, each having a thickness of from about 2 microns to about 25 microns. The adhesive is not present on the metal barrier layer 212 in the region of each aperture 215. For example, application of adhesive to this region may be avoided, or adhesive may be applied to the region before being subsequently removed, such as by laser ablation. As a result, the apertures 215 in the inner layer 213 each form a trench in the first multi-layer laminate with a depth of from around 20 to 100 microns within which the electrolyte is located, this being the combined thickness of the inner layer 213 and the adhesive layer 214.

Similarly to the first film layer 210, in this example, the second film layer 220 comprises an outer structural layer 221 formed from a PET film having a thickness of 12 microns, a barrier layer 222 formed from a metal film having a thickness of 15 microns, and an inner layer 223 formed from an oriented PP film having a thickness of 40 microns and which is heat sealable at about 130 degrees Celsius. The three layers are bonded together using intermediate layers of adhesive, each having a thickness of from about 2 microns to about 25 microns. The adhesive is not applied to the metal barrier layer 222 in the region of each aperture 225. As a result, the apertures 225 in the inner layer 223 each form a trench in the second film layer 220 with a depth of from around 42 to 50 microns, this being the combined thickness of the inner layer 223 and the adhesive layer 224.

In this example, the first film layer 210 has a thickness of from about 60 to about 80 microns and the second film layer 220 has a thickness of from about 70 to about 90 microns. The first and second film layers 210 and 220 are bonded together by heat sealing of the inner layers 213, 223 to provide a total packaging film thickness of about 150 microns.

Figure 3:
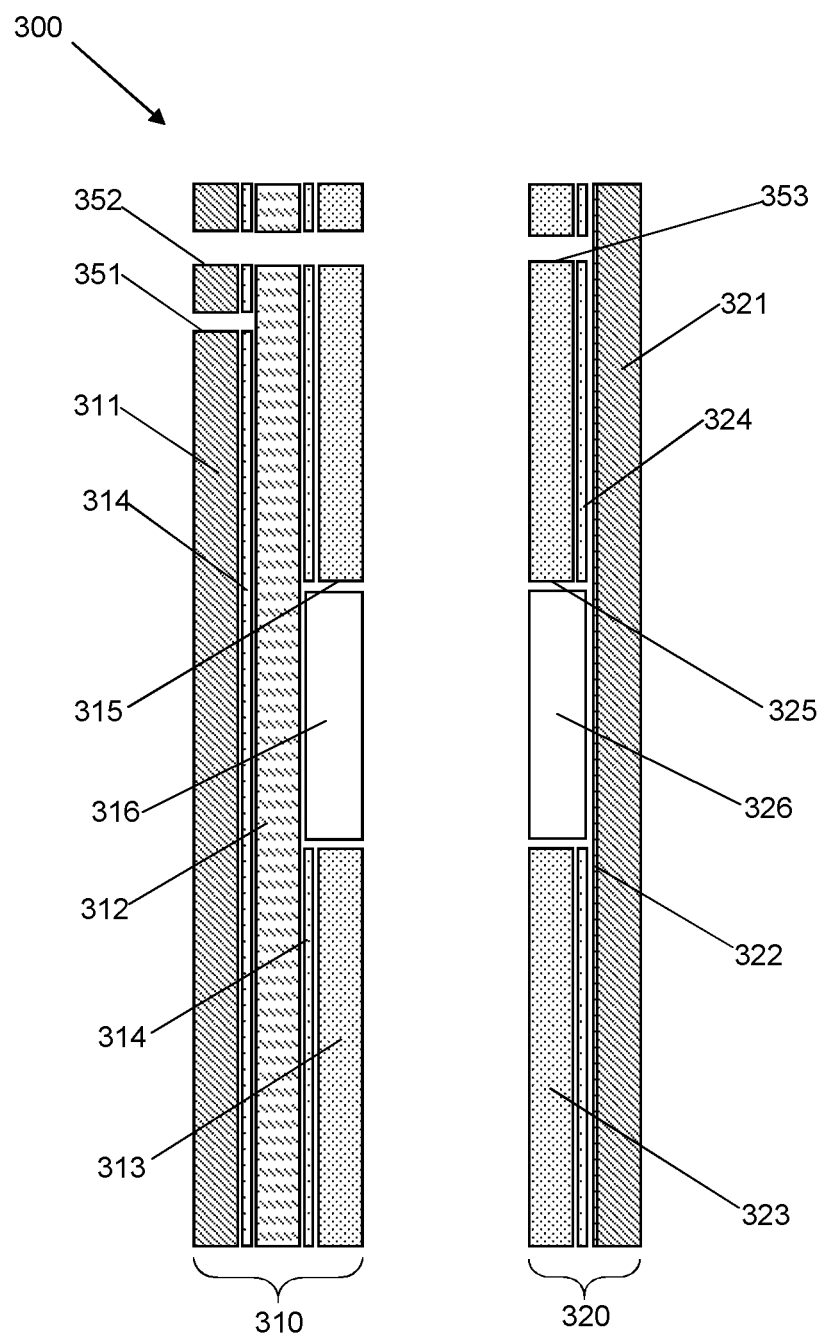

FIG. 3 is cross-section of the flexible packaging material of FIG. 1 taken along line A-A, showing a second embodiment of laminate structure 300. The second embodiment of laminate structure 300 is similar in construction and operation to first embodiment of laminate structure 200, and where the same features are present, like reference numerals have been used. However, in the second embodiment of laminate structure 300, the outer layer 321 of the second film layer 320 is a metallised film and the conductive barrier layer 322 is formed from the metallised coating on the inner surface of the outer layer 321. Although the resulting metallised coating has a thickness of only a few hundred nanometres, its electrical conductivity properties have been found to be sufficient for its application as a current collector. Also, the barrier properties of the first film layer 310 should be sufficient to account for any loss in the barrier properties of the second multi-layer laminate 320.

As per the first embodiment of laminate structure 100, the second embodiment of laminate structure 300 includes a first contact aperture 351 extending through the outer insulating layer 311 of the first film layer 310, and includes a second contact aperture 352 extending through the entire thickness of the first film layer 310 and aligned with a third contact aperture 353 through the inner insulating layer 323 of the second film layer 320. As shown, the diameter of the second contact aperture 352 is greater than the diameter of the third contact aperture 353. With this arrangement, the edges of the second contact aperture 352 rest on the inner insulating layer 323 surrounding the third contact aperture 353. Thus, the conductive barrier layer 322 exposed through the third contact aperture 353 is separated from the edges of the second contact aperture 352 by the inner insulating layer 323 to reduce the risk of shorting between the conductive barrier layers 312, 322.

In this example, the structures of the first and second multi-layer laminates 310, 320 are the same as the first and second multi-layer laminates 210, 220 of the first embodiment, with the exception of the second outer layer 321 and the second metal barrier layer 322 which are instead formed from a single layer of metallised plastic, such as metallised PET ("MET-PET") having a thickness of 12 microns and so only a single layer of adhesive is required to hold the second laminate film 320 together. As a result, second multi-layer laminate 320 has a thickness of from about 55 to about 65 microns, leading to a total packaging film thickness of about 135 microns. Although in this example the second conductive barrier layer 322 has a thickness of 12 microns, it may have any suitable thickness, for example from 50 nm to 10 microns.

Figure 4:
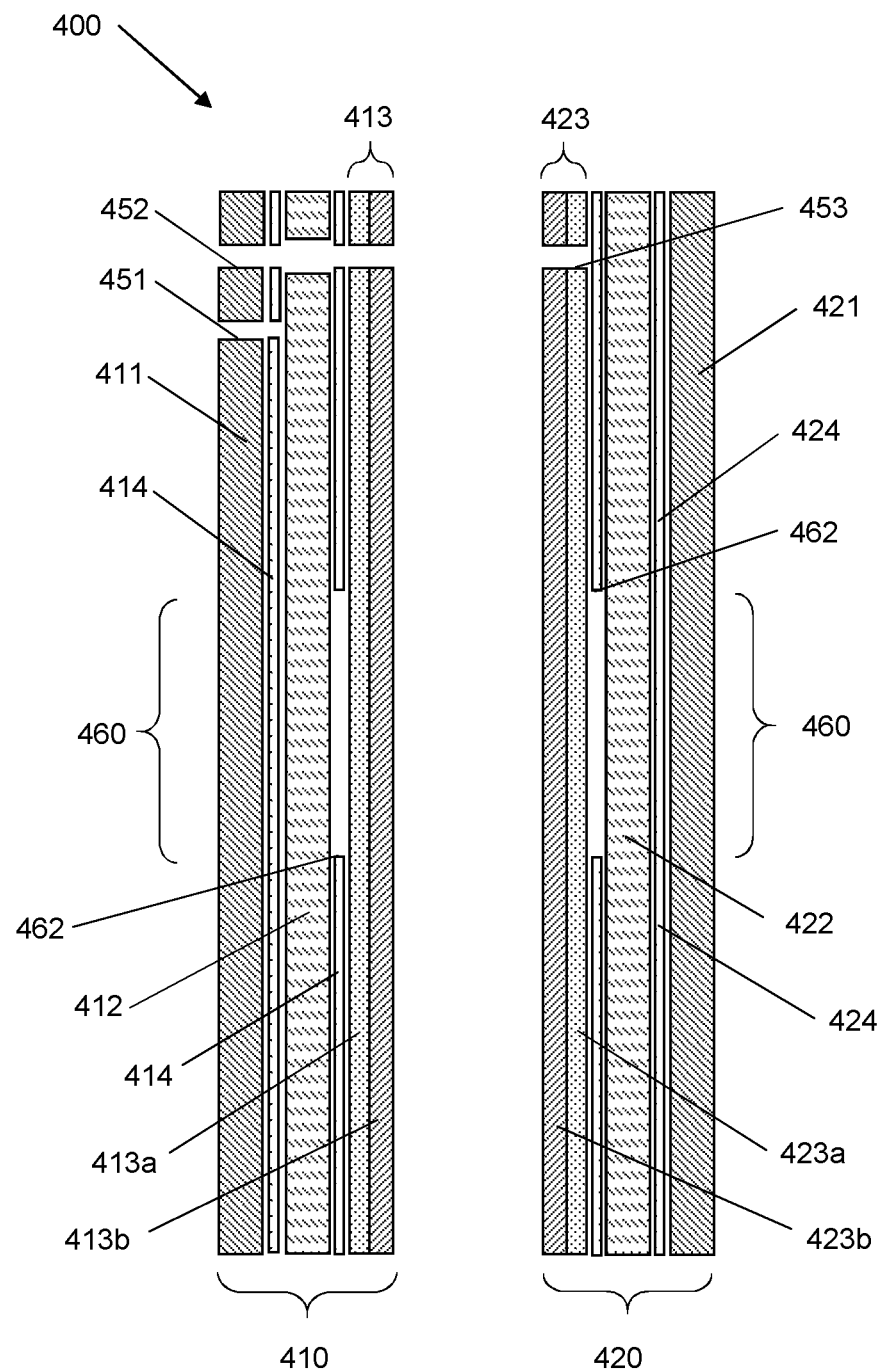
FIG. 4 is cross-section of the flexible packaging material of FIG. 1 taken along line A-A, showing a third embodiment of laminate structure in which the first and second multi-layer laminates are shown separately for clarity.

FIG. 4 is cross-section of the flexible packaging material of FIG. 1 taken along line A-A, showing a third embodiment of laminate structure 400 for the first and second film layers. The first and second film layers 410, 420 each have a laminate structure that is similar to that used in conventional triple-layer laminate packaging materials, for example those used in food packaging. As shown in FIG. 4, the first film layer 410 comprises a structural outer insulating layer 411, an inner insulating layer 413, and a metallic moisture barrier layer 412 sandwiched between the outer and inner layers 411, 413. The conductive moisture barrier layer 412 is bonded to each of the outer and inner layers 411, 413 using a thin layer of adhesive 414 having a thickness of from about 2 microns to about 25 microns. Similarly, the second film layer 420 comprises a structural outer layer 421, and inner layer 423 and a metallic barrier layer 422 sandwiched between the outer and inner layers 421, 423 and bonded together using a layer of adhesive 424. The first and second film layers 410, 420 are bonded to one another so that the inner layers 413 and 423 face each other and the outer layers 411, 421 form the outer surfaces of the packaging material.

The outer layers 411, 421 are each formed from an electrically insulative film. One or both of the outer layers 411, 421 are preferably printable, or "print receptive" so that they may form a printing substrate onto which information, branding, graphics, or other packaging indicia may be printed. In this example, the structural outer layers 411, 421 are formed from a thermoplastic such that they may be bonded together through the application of heat to form a seal. This allows the packaging material to be folded around a product to be packaged and sealed together through the application of heat, either by bonding the first outer layer 411 to the second outer layer 421 or by bonding the first outer layer 411 or second outer layer 421 to itself. Suitable materials for the structural outer layers 411, 421 include polymers, such as PET or Nylon, for example oriented Nylon. Such materials have been found to provide both sufficient strength and flexibility to the packaging material.

The metallic barrier layers 412, 422 are each formed from a flexible metal film. The layers provide an oxygen and moisture barrier which is also electrically conductive. The presence of the barrier layers 412, 422 allows the packaging material to be used to protect the contents of a package from the surrounding environment. The barrier layers 412, 422 may be formed from any suitable metal or alloy. For example, the barrier layers 412, 422 may be formed from a zinc, copper, nickel, tin or aluminium film.

The inner layers 413, 423 also have a laminate structure having two layers formed from electrically insulative films. The first inner layer 413 comprises a first or inner heat-sealable layer 413b and a second or outer high-melting point or non-heat-seal layer 413a. The second inner layer 423 comprises a first or inner heat-sealable layer 423b and a second or outer high-melting point or non-heat-seal layer 423a.

The inner heat-sealable layers 413b, 423b face each other and are formed from a thermoplastic such that they may be bonded together through the application of heat to form a seal. By this seal, electrochemical cells may be contained within the packaging to prevent leakage of the electrolyte. Suitable materials for the inner heat-sealable layers 413b, 423b include polymers, such as polypropylene, for example oriented polypropylene, polyethylene, or polyurethane.

As their name suggests, the outer high-melting point layers 413a, 423a of the first and second film layers 410, 420 are sandwiched between their respective metallic barrier layer 412, 422 and inner heat-sealable layer 413b, 423b and are formed from a polymer film having a higher melting point than the inner heat-sealable layers 413b, 423b. During heat-sealing, the outer high-melting point layers 413a, 423a are not affected by the application of heat and remain in place unaltered between the metallic barrier layers 412, 422 such that the metallic barrier layers 412, 422 are separated by the outer high-melting point layers 413a, 423a, thereby reducing the likelihood of electrical shorting of the metallic barrier layers 412, 422. Suitable materials for the outer high-melting point layers 413a, 423a include polymers which have a melting point in excess of 130 degrees Celsius, for example, polyethylene terephthalate (PET), polyethylene naphthalate (PEN), biaxially-oriented polyethylene terephthalate (boPET), Polytetrafluoroethylene (PTFE), cellulose, polyimide and nylon.

As discussed above, the packaging materials according to the present invention have a plurality of electrochemical cells which can be connected to provide an electrical current to an electrical device associated with the packaging material. The cells make use of the conductivity of the metal barrier layers which exist in conventional packaging materials. Furthermore, in the present embodiment, the cells also make use of the inner layers 413, 423 to act as a cell separator to separate the anode and cathode but also to permit ionic connection between the anode and cathode via the electrolyte.

To achieve this, the inner layers 413, 423 of each of the first and second film layers 410, 420 are porous or permeable such that the electrolyte can permeate into the inner layers 413, 423 in the electrolyte region 460 of the electrochemical cell and ionically connect the anode and cathode. Porosity can be imparted to the inner layers 413, 423 by some form of ablative treatment, for example, mechanical perforation, laser drilling, ion beam bombardment or electromagnetic radiation. In addition, the inner layers 413, 423 may undergo some form of surface treatment to improve electrolyte wetting.

The porosity can either be imparted to the inner layers 413, 423 only in the region 460 of the electrochemical cell or it can be imparted to the entirety of the inner layers 413, 423. In the present embodiment, porosity has been imparted to the entirety of the inner layers 413, 423. As mentioned above, each of the inner layers 413, 423 is attached to its respective metallic barrier layer 412, 422 by a layer of adhesive 414, 424. However, in the electrolyte region 460 of the electrochemical cell there is a break or opening 462 in the adhesive layers 414, 424 such that no adhesive is present in the electrolyte region 460 of the electrochemical cell. The adhesive layers 414, 424 effectively form an adhesive seal or gasket around the electrolyte region 460 which further reduces the likelihood of electrolyte escaping from the electrochemical cell. This break 462 in the adhesive layers 414, 424 allows the electrolyte to contact the metallic barrier layers 412, 422. The adhesive layers 414, 424 can be applied by any suitable printing technique. One suitable printing technique is gravure, which lends itself to high speed manufacturing techniques and can be patterned. The pattern would define the break or opening 462 in the adhesive layers 414, 424 and avoid applying adhesive in the region 460 of the electrochemical cell. Adhesive is applied to the remainder of the inner layers 413, 423, i.e. the area outside the electrolyte region 460 of the electrochemical cell, where the pores increase the surface area of the inner layers 413, 423 and improve the strength of the bond. Furthermore, the adhesive in the area outside the region 460 of the electrochemical cell blocks the pores and reduces or eliminates the porosity in this area of the inner layers 413, 423.

The electrolyte region 460 of the electrochemical cell is provided with an electrolyte (not shown). In this example, the electrolyte comprises an aqueous solution of potassium hydroxide, although other electrolytes may be used. The heat-sealable layers 413b, 423b are sealed together around the electrolyte region 460 of each electrochemical cell by heat sealing. Thus a continuous seal is formed around each electrochemical cell. This may help to prevent the electrolyte from leaking or drying out.

In this example, the conductive barrier layer 412 of the first film layer 410 comprises an anode material such that the conductive barrier layer 412 forms both the anode current collector and the anode. The conductive barrier layer 422 of the first film layer 420 comprises an cathode material such that the conductive barrier layer 422 forms both the cathode current collector and the cathode.

The second conductive barrier layer 422 is formed from a different material to the first conductive barrier layer 412 such that the first and second conductive barrier layers 412, 422 have different electrochemical potentials. For example, where the first conductive barrier layer 412 is zinc, the second conductive barrier layer 422 may, for example, be formed from manganese oxide, silver oxide, or nickel. It will be apparent that a variety of different materials may be used for the first and second barrier layers 412, 422 to form a variety of anode/cathode pairs. The first and second barrier layers 412, 422 are ionically connected across the inner layers 413, 423 by the electrolyte and interact to create a voltage difference between the first and second barrier layers 412, 422. Thus, the first and second barrier layers 412, 422 form an anode and cathode, respectively, of an electrochemical cell. Further, due to the conductive nature of the first barrier layer 412 it also acts as a current collector on the anode side, as well as a moisture and oxygen barrier. Similarly, the second barrier layer 422 acts as a current collector on the cathode side, as well as a moisture and oxygen barrier.

As per the first and second embodiments of laminate structure 100, the third embodiment of laminate structure 400 includes a first contact aperture 451 extending through the outer insulating layer 411 of the first film layer 410, and includes a second contact aperture 452 extending through the entire thickness of the first film layer 410 and aligned with a third contact aperture 453 through the inner insulating layer 423 of the second film layer 420. As shown, the diameter of the second contact aperture 452 is greater than the diameter of the third contact aperture 453. With this arrangement, the edges of the second contact aperture 452 rest on the inner insulating layer 423 surrounding the third contact aperture 453. Thus, the conductive barrier layer 422 exposed through the third contact aperture 453 is separated from the edges of the second contact aperture 452 by the inner insulating layer 423 to reduce the risk of electrical shorting between the conductive barrier layers 412, 422. The thickness of the film layers of the third embodiment are similar to those of the first embodiment.

By making use of the conductive nature of the barrier layers used in conventional packaging and using the inner layers to act as a cell separator and incorporating these into an electrochemical cell structure, packaging materials according to the invention are able to provide an extremely thin, flexible battery for providing electrical power to an electrical device, or devices, associated with the packaging. In particular, it is estimated that the third embodiment may assist in reducing the thickness of the electrochemical cell by 30 to 50 microns. Furthermore, by not using separate electrolyte and cathode layers, bulges in the packaging material in the region of the electrochemical cell can be avoided.

Figure 5:
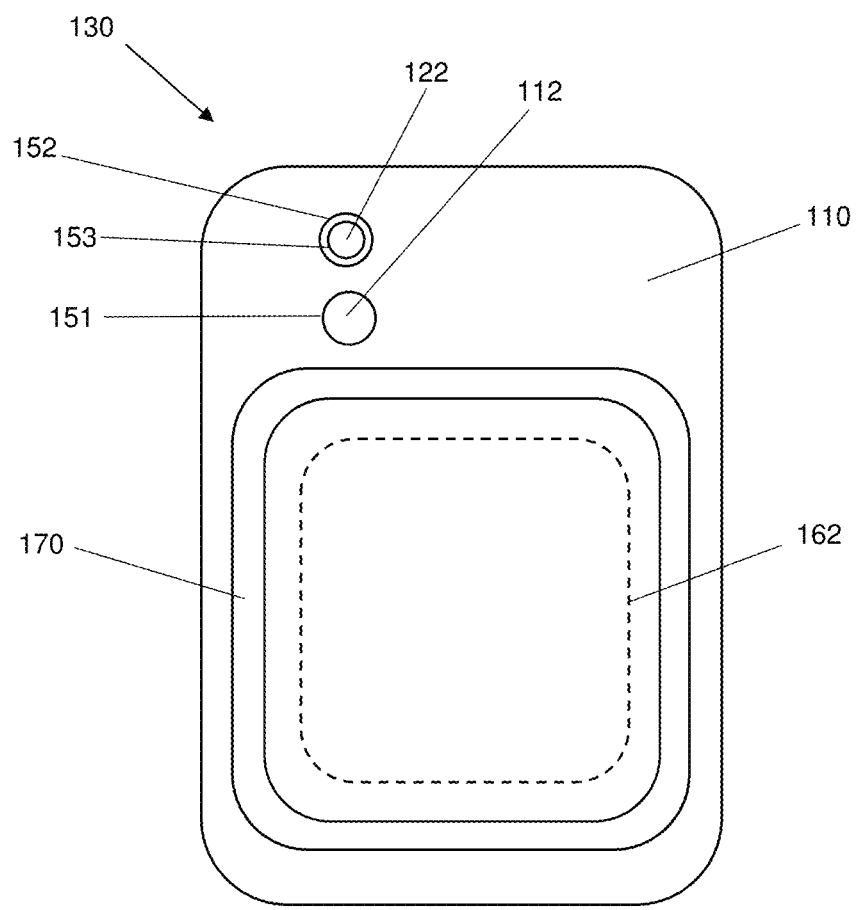
FIG. 5 is a schematic plan view of a single electrochemical cell of the flexible packaging material of FIG. 1.

FIG. 5 shows schematic plan view of a single electrochemical cell 130 of the flexible packaging material of FIG. 1. When referring to the same or corresponding features of the various described embodiments, like reference numerals have been used. The anode, cathode and electrolyte components of the electrochemical cell 130 are contained within heat seal 170 which is formed by the application of heat to the packaging material and bonds the inner layers (not shown) of the laminate structure together. The heat seal 170 helps to inhibit the leakage of electrolyte from the electrochemical cell 130.

A first contact aperture 151 extends through the outer insulating layer of the first film layer 110. A second contact aperture 152 extends through the entire thickness of the first film layer 110 and is aligned with a third contact aperture 153, which extends through the inner insulating layer of the second film layer (not shown). The first contact aperture 151 exposes the conductive barrier layer 112 of the first film layer 110 to the outside of the packaging material, while the second contact aperture 152 and third contact aperture 153 expose the conductive barrier layer 122 of the second film layer (not shown) to the outside of the packaging material. As can be seen from FIG. 5, this arrangement allows the contact apertures to be located on the same side of the packaging material which makes it easier to access and connect to the electrical contacts of the electrochemical cell 130.

As mentioned above, each of the inner layers (not shown) is attached to its respective metallic barrier layer 112, 122 by a layer of adhesive (not shown). There is a break or opening 162 (shown with a dashed line in FIG. 5) in the adhesive layer to allow the electrolyte to ionically connect the anode and cathode of the electrochemical cell. The opening 162 in the adhesive layer therefore defines the inside edge of an adhesive seal or gasket formed around the electrolyte region of the electrochemical cell 130 providing a further seal for resisting the leakage of the electrolyte, which can be corrosive to the metals used in the metallic barrier layers 112, 122. If the electrolyte leaks it can corrode the metallic barrier layers 112, 122, which can make it difficult to use the metallic barrier layers 112, 122 as the electrical contacts for the electrochemical cell. However, the adhesive gasket reduces the likelihood of electrolyte escaping from the electrochemical cell and allows the use of the metallic barrier layers 112, 122 as the electrical contacts for the electrochemical cell 130. An advantage of metal electrical contacts is that they are more robust and have a lower contact resistance compared to some alternatives, for example, printed carbon electrical contacts.

The specific embodiments and examples described above illustrate but do not limit the invention. It is to be understood that other embodiments of the invention may be made and the specific embodiments and examples described herein are not exhaustive.

The invention claimed is:

1. A flexible multi-layer packaging material comprising:
   a first film layer;
   a second film layer; and
   at least one electrochemical cell located within the first and second film layers, the at least one electrochemical cell comprising an anode, a cathode, an anode current collector, a cathode current collector, and an electrolyte by which the anode and the cathode are ionically connected;
   wherein at least one of the first and second film layers is a multi-layer laminate comprising an outer insulating layer, an inner insulating layer, and a conductive moisture barrier layer between the inner and outer insulating layers and in electrical contact with the electrolyte,
   wherein the conductive moisture barrier layer comprises an anode material such that the conductive moisture barrier layer defines both the anode and the anode current collector of the at least one electrochemical cell or wherein the conductive moisture barrier layer comprises a cathode material such that the conductive moisture barrier layer defines both the cathode and the cathode current collector of the at least one electrochemical cell;
   wherein the inner insulating layer of the at least one of the first and second film layers comprises an aperture to allow the electrolyte to contact the conductive moisture barrier layer and to provide electrical contact between the conductive moisture barrier layer and the electrolyte, and
   wherein one of the first and second film layers comprises at least one first contact aperture in its outer insulating layer, through which its conductive barrier layer is accessible from outside of the flexible multi-layer packaging material, and at least one second contact aperture extending through its entire thickness by which the conductive moisture barrier layer of the other one of the first and second film layers is accessible from outside of the flexible multi-layer packaging material on the same side of the flexible multi-layer packaging material as the at least one first contact aperture.

2. The flexible multi-layer packaging material according to claim 1, wherein both the first and second film layers is a multi-layer laminate, the flexible multi-layer packaging material further comprising at least one cell cavity within which one or more components of the at least one electrochemical cell are located, the at least one cell cavity being defined by at least one aperture in the inner insulating layer of one or both of the first and second film layers.

3. The flexible multi-layer packaging material according to claim 2, wherein the conductive moisture barrier layer of the first film layer comprises an anode material and the cathode is located in the at least one aperture of the second film layer, such that a first side of the cathode is in direct contact with the electrolyte and a second side of the cathode, which is opposite to the first side of the cathode, is in direct contact with the conductive barrier layer of the second film layer; or
   wherein the conductive moisture barrier layer of the second film layer comprises a cathode material and the anode is located in the at least one aperture of the first film layer, such that a first side of the anode is in direct contact with the electrolyte and a second side of the anode, which is opposite to the first side of the anode, is in direct contact with the conductive barrier layer of the first film layer.

4. The flexible multi-layer packaging material according to claim 1, wherein each of the first and second film layers is a multi-layer laminate comprising an outer insulating layer, an inner insulating layer, and a conductive moisture barrier layer between the inner and outer insulating layers and in electrical contact with the electrolyte, wherein the conductive moisture barrier layer of the first film layer comprises an anode material such that the conductive moisture barrier layer of the first film layer defines both the anode and the anode current collector of the at least one electrochemical cell and wherein the conductive moisture barrier layer of the second film layer comprises a cathode material such that the conductive moisture barrier layer of the second film layer defines both the cathode and the cathode current collector of the at least one electrochemical cell; and wherein both the inner insulating layers of the first and second film layers comprise an aperture to allow the electrolyte to contact their respective conductive moisture barrier layers and to provide electrical contact between the conductive moisture barrier layers and the electrolyte.

5. The flexible multi-layer packaging material according to claim 2, wherein the at least one cell cavity is a plurality of cell cavities and the at least one electrochemical cell is a plurality of electrochemical cells, each of which is at least partially located within an individual cell cavity.

6. The flexible multi-layer packaging material according to claim 1, wherein the at least one second contact aperture is defined by an aperture in each of the outer insulating layer, the conductive barrier layer, and the inner insulating layer of the respective first or second film layer, wherein the aperture in the conductive barrier layer has a larger diameter than one or both of the apertures in the inner and outer insulating layers.

7. The flexible multi-layer packaging material according to claim 1, wherein the moisture barrier layer of one or both of the first and second film layers is provided as a coating applied on the inner surface of its respective outer insulating layer.

8. The flexible packaging multi-layer material according to claim 1, wherein the conductive moisture barrier layer of one or both of the first and second film layers comprises a metal or alloy.

9. The flexible packaging multi-layer material according to claim 1, wherein the inner insulating layer of at least one of the first and second film layers is a multi-layer laminate comprising first and second layers, wherein the first layer has a melting point such that it is heat-sealable at a predetermined temperature and wherein the second layer has a melting point which is above the predetermined temperature such that the second layer does not melt when the first layer is heat sealed.

10. A flexible multi-layer packaging material comprising:
a first film layer;
a second film layer, and
at least one electrochemical cell located within the first and second film layers, the at least one electrochemical cell comprising an anode, a cathode, an anode current collector, a cathode current collector, a separator for separating the anode and cathode, and an electrolyte by which the anode and the cathode are ionically connected,
wherein at least one of the first and second film layers is a multi-layer laminate comprising an outer insulating layer, an inner insulating layer, and a conductive moisture barrier layer between the inner and outer insulating layers and in electrical contact with the electrolyte;

wherein the conductive moisture barrier layer comprises an anode material such that the conductive moisture barrier layer defines both the anode and the anode current collector of the at least one electrochemical cell or wherein the conductive moisture barrier layer comprises a cathode material such that the conductive moisture barrier layer defines both the cathode and the cathode current collector of the at least one electrochemical cell;

wherein the inner insulating layer of the at least one of the first and second film layers defines the separator, wherein the inner insulating layer of the at least one of the first and second film layers is porous at least in the region of the at least one electrochemical cell such that the electrolyte can permeate the inner insulating layer in the region of the electrochemical cell to provide electrical contact between the conductive moisture barrier layer and the electrolyte and to ionically connect the anode and cathode, and wherein one of the first and second film layers comprises at least one first contact aperture in its outer insulating layer, through which its conductive barrier layer is accessible from outside of the flexible multi-layer packaging material, and at least one second contact aperture extending through its entire thickness by which the conductive moisture barrier layer of the other one of the first and second film layers is accessible from outside of the flexible multi-layer packaging material on the same side of the flexible multi-layer packaging material as the at least one first contact aperture.

11. The flexible packaging multi-layer material according to claim 10, wherein the inner insulating layer of at least one of the first and second film layers is a multi-layer laminate.

12. The flexible packaging multi-layer material according to claim 11, wherein the multi-layer laminate of the inner insulating layer comprises first and second layers, wherein the first layer has a melting point such that it is heat-sealable at a predetermined temperature and wherein the second layer has a melting point which is above the predetermined temperature such that the second layer does not melt when the first layer is heat sealed.

13. The flexible packaging multi-layer material according to claim 10, wherein the inner insulating layer and the conductive moisture barrier layer of at least one of the first and second film layers are bonded together with a layer of adhesive, wherein the adhesive layer comprises an opening in the region of the electrochemical cell to permit electrical contact between the conductive moisture barrier layer and the electrolyte, wherein the adhesive layer defines a seal around the opening to resist leakage of the electrolyte from the electrochemical cell.

14. A battery cell formed from a flexible multi-layer packaging material according to claim 1.

15. A pack of consumer goods comprising a container formed from a flexible packaging material according to claim 1 and an electrical device electrically connected to the at least one electrochemical cell of the flexible multi-layer packaging material.

* * * * *